Figure 3:
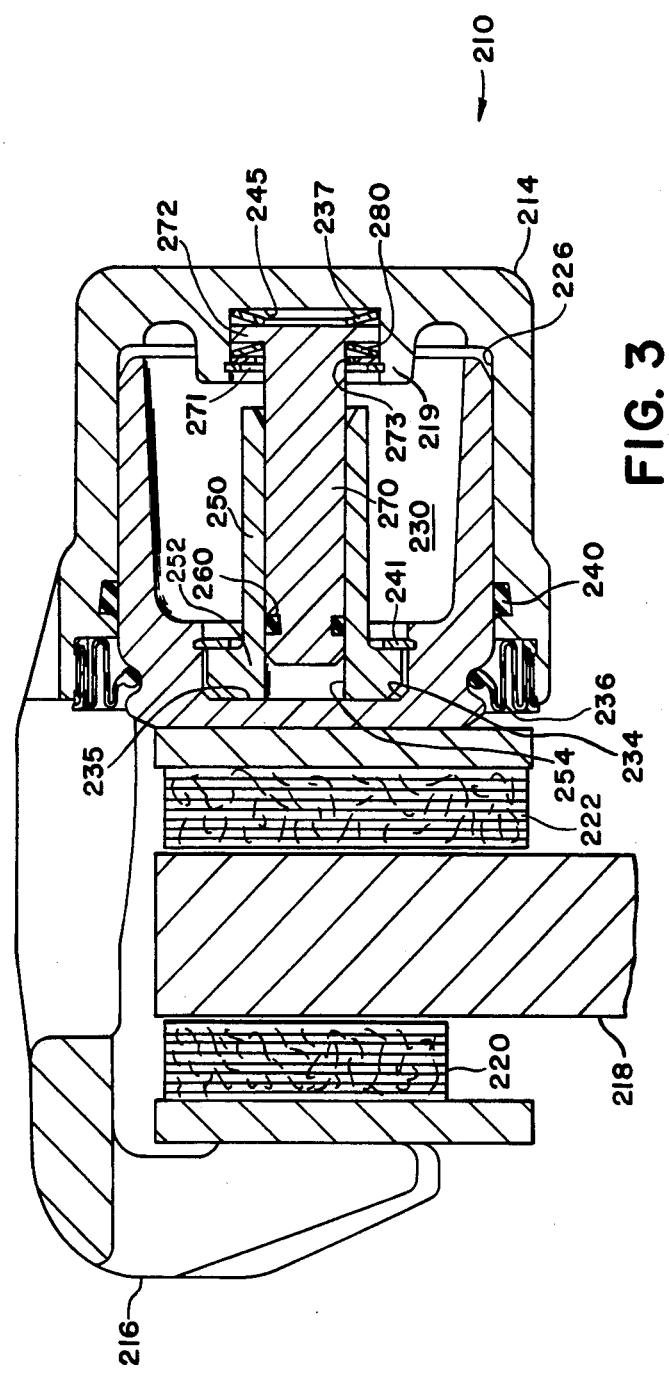

United States Patent [19]

Temple et al.

[11] Patent Number: 4,712,654
[45] Date of Patent: Dec. 15, 1987

[54] BRAKE ASSEMBLY WITH MULTIPLE ADJUSTABILITY

[75] Inventors: Robert B. Temple; James J. Colpaert, both of Granger, Ind.

[73] Assignee: Allied Corporation, Morristown, N.J.

[21] Appl. No.: 939,588

[22] Filed: Dec. 9, 1986

[51] Int. Cl.[4] ........................................... F16D 65/54
[52] U.S. Cl. .................... 188/71.8; 188/196 P
[58] Field of Search ............... 188/71.8, 71.9, 72.3, 188/79.5 GE, 196 A, 196 P, 216, 217

[56] References Cited

U.S. PATENT DOCUMENTS

| 2,801,712 | 8/1957 | Lockhart | 188/71.8 |
|---|---|---|---|
| 2,888,104 | 5/1959 | Frayer | 188/71.8 |
| 3,122,222 | 2/1964 | Burnett et al. | 188/196 P |
| 3,232,387 | 2/1966 | Meier et al. | 188/71.8 |
| 3,277,983 | 10/1966 | Jeffries | 188/196 P |
| 3,338,354 | 8/1967 | Jeffries | 188/196 P |
| 3,497,036 | 2/1970 | Seip | 188/71.8 |
| 3,605,959 | 9/1971 | Beck | 188/196 P |
| 3,633,715 | 1/1972 | Burnett | 188/170 |
| 3,701,398 | 10/1972 | Martins | 188/71.8 |
| 3,789,961 | 2/1974 | Warwick | 188/345 |
| 3,958,670 | 5/1976 | Anderson | 188/196 R |
| 4,180,146 | 12/1979 | Airheart | 188/71.8 |

FOREIGN PATENT DOCUMENTS

| 2057322 | 6/1980 | Fed. Rep. of Germany . |
| 1428249 | 4/1967 | France . |
| 4750552 | 12/1969 | Japan . |
| 53-27124 | 9/1979 | Japan . |
| 995326 | 6/1965 | United Kingdom . |
| 1099402 | 1/1968 | United Kingdom . |

Primary Examiner—Duane A. Reger

Attorney, Agent, or Firm—Larry J. Palguta; Ken C. Decker

[57] ABSTRACT

The brake assembly (10, 110, 210) comprises a caliper housing (14, 114, 214) having a bore (26, 226) with a first piston (30, 230) slidably received therein. The first piston (30, 230) includes a recess (34, 234) receiving the head (52, 252) of a longitudinally extending rod (50, 250), the head (52) displaced from a surface (35) of the recess (34) by a resilient mechanism (37). The piston (30, 230) has a first seal (40, 240) disposed thereabout. The longitudinally extending rod (50) has an end (54) with a second seal (60) disposed thereabout, the end (54) received slidably within a tube (70) having a flange (72). The flange (72) of the tube (70) has a first spring (80, 180) located thereabout, the first spring (80, 180) biasing tube (70) away from a second piston (90) positioned about the tube (70) and rod (50). A retainer (110) is mounted fixedly within the bore (26) and extends longitudinally within an enlarged opening portion (32) of the first piston (30) to provide an abutment for a second spring (100) which biases the second piston (90) away from the first piston (30). The brake assembly (10, 110) provides the combination of an automatic pressure compensated adjustment, positive piston retraction, and piston knock-back control. Alternatively, the brake assembly (210) may include positive piston retraction and piston knock-back control by having a second rod (270) received within an opening (254) of the first rod (250), the resilient mechanism (237) located between the flange (272) and a caliper housing wall (245), and a spring (280) for piston retraction disposed between the flange (272) and an extension (219) of the caliper housing (214).

23 Claims, 3 Drawing Figures

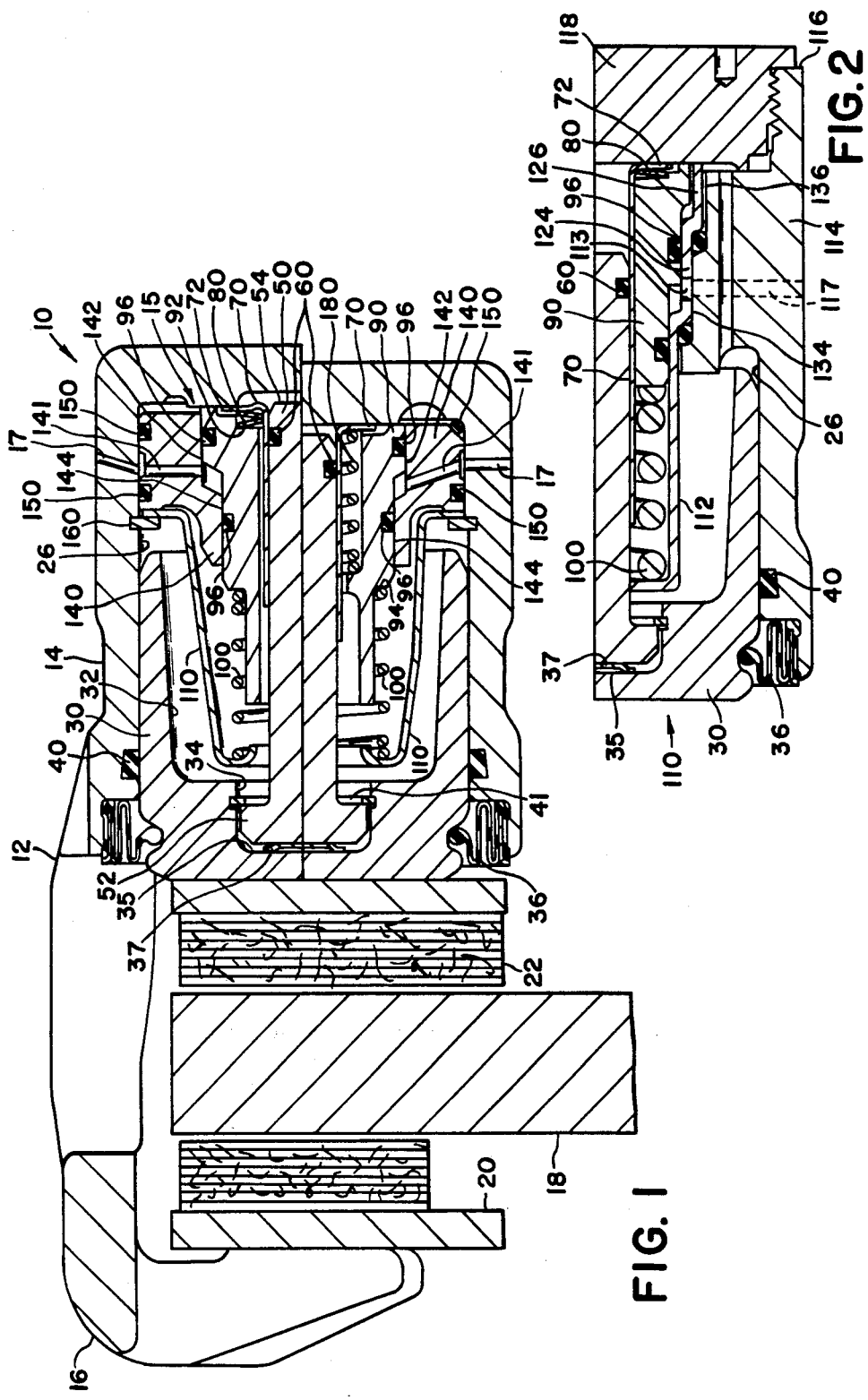

BRAKE ASSEMBLY WITH MULTIPLE ADJUSTABILITY

The present invention relates to a disc brake which may include the combination of an automatic pressure compensated adjustment assembly, positive piston retraction, and piston knock-back control.

Vehicle manufacturers have long had a major concern for one highly subjective item when evaluating a brake system. This item is called "brake feel". Major manufacturers have attempted to quantify "feel" so that the evaluation could be objective rather than subjective. However, this is very difficult. "Feel" or "pedal feel" has many constituents, i.e., travel, effort, vehicle deceleration, driver seating/brake pedal relationship, and vehicle suspension characteristics. The greatest single variable, both when the vehicle is new and over the life of the vehicle, is free pedal travel. With front disc brakes, the free pedal travel varies directly with caliper piston retraction/roll back and/or knock-back. The present invention addresses these characteristics relating to brake feel.

"Fast fill" master cylinders have been provided in order to allow high piston retraction with reduced free pedal travel, but "feel" may not be consistent. The present invention provides an economical and consistent alternative to some "fast fill" master cylinder constructions. The invention provides an economical means for correcting unforeseen brake "feel" problems. It reduces drag resulting from under-retraction caused by actuation pressures greater than expected during the design of the caliper head.

The present invention comprises a disc brake assembly having a caliper connected with a caliper housing having therein a bore, a first piston disposed within the bore for slidable movement therein, a first seal disposed between the piston and caliper housing, a rod extending within said bore and having a head connected with the first piston, resilient means disposed between the first piston and head, the rod having a tube disposed thereabout and the tube having a radially extending flange, a second seal disposed between said rod and tube, a second piston disposed within said bore and about said tube and rod, a first spring disposed between said flange and second piston, a retainer connected with the caliper housing and disposed within said bore, and a second spring located between and biasing apart said retainer and second piston, so that said second seal has a resistance to movement of the rod relative to the tube which resistance is greater than a resistance to movement effected by the first seal for movement of the first piston relative to the caliper housing. The invention also comprises a caliper connected with a caliper housing having a bore, a piston disposed within the bore for slidable movement therein, a first seal disposed between the piston and caliper housing, and adjustment and deflection means located within the bore, characterized in that the adjustment and deflection means comprises a first rod extending within said bore and connected with said piston, the first rod having an opening therein and receiving a second rod within the opening, a second seal disposed between said rods, the second rod having a flange about an end received within a caliper housing extension located within the bore, a first spring disposed between one side of said flange and said housing extension, a second spring disposed on the other side of the flange between the flange and caliper housing, so that said second seal has a resistance to movement of the first rod relative to the second rod which resistance is greater than a resistance to movement effected by the first seal for movement of the piston relative to the caliper housing.

The invention is described in detail below with reference to the drawings which illustrate embodiments thereof, in which:

FIG. 1 is section view of the disc brake assembly of the present invention, the lower half showing an alternative embodiment for the first spring; and FIG. 2 is an alternative embodiment of the disc brake of FIG. 1; and FIG. 3 is an alternative embodiment of the invention.

FIG. 1 illustrates the disc brake assembly designated generally by reference numeral 10. Assembly 10 includes a caliper 12 connected with a caliper housing 14, caliper 12 including nose portion 16 which engages outer brake pad 20. Inner brake pad 22 is carried by assembly 10 and is located adjacent rotor 18. Bore 26 disposed within caliper housing 14 includes a first piston 30 slidably received therein. First seal 40 is located about the surface of first piston 30. First seal 40 ensures that brake fluid is retained within bore 26, particularly when piston 30 is displaced outwardly against inner brake pad 22. A standard boot seal 36 is located about piston 30. First piston 30 has an enlarged opening 32 communicating with recess 34. Surface or wall 35 of recess 34 is adjacent head 52 of longitudinal rod 50. Clip 41 attached to first piston 30 traps head 52 within recess 34, with resilient means 37 biasing the head 52 away from wall or surface 35.

Rod 50 extends longitudinally within bore 26 and includes end 54 which has second seal 60 disposed thereabout. Located about rod 50 is longitudinally extending tube 70 which has flange 72 that abuts end wall 15 of bore 26. A first spring 80 is located about rod 50 and tube 70, the first spring 80 biasing flange 72 of tube 70 away from a second piston 90. Second piston 90 is located coaxially about rod 50 and tube 70, and includes a shoulder or abutment 92 engaged by first spring 80 and a second shoulder 94 engaged by a second spring 100. Second spring 100 biases second piston 90 away from a retainer 110 which is located fixedly within bore 26, so that piston 90 is in contact with wall 15 of housing 14. Located coaxially about rod 50, tube 70, second piston 90, is housing part 140. Housing part 140 includes seals 150 which engage sealingly the surface of bore 26. Vent 141 of part 140 communicates with caliper housing vent 17. Second piston 90 includes seals 96 which engage sealingly the interior diameter portions 142 and 144 of housing part 140. Clip 160 located fixedly within caliper housing 14 secures retainer 110 against housing part 140. As the lower portion of FIG. 1 illustrates, an alternative construction includes the first spring 80 being replaced by a coil spring 180, thereby enabling a shortening of the longitudinal or axial length of caliper housing 14.

When the vehicle operator depresses the brake pedal to effect operation of the brakes, the increase in brake fluid pressure within bore 26 displaces first piston 30 into engagement with inner brake pad 22 which engages rotor 18, and by reaction outer brake pad 20 is moved into engagement with the opposite side of rotor 18. The magnitude of the displacement of the brake pads requires a significant increase in the volume of actuating fluid within the bore. The present invention controls the amount of actuating fluid required in the following manner: the second seal 60 has a higher sliding force or resistance to movement of the rod 50 relative to the tube 70 than the sliding force or resistance effected by first seal 40 for movement of first piston 30 relative to housing 14. The first spring 80 provides a predetermined distance or separation between flange 72 and second piston 90, this predetermined separation being the running clearance effected between the brake pads and rotor. First spring 80 has a spring force or load which is greater than the sliding force or resistance to movement imposed by first seal 40 but less than the resistance to movement imposed by second seal 60, thus assuring that upon decrease of the actuating fluid pressure piston 30 will be returned by an amount equal to the clearance between the flange 72 and second piston 90. In order to ensure that excess first piston 30 travel resulting from a high actuating fluid pressure will not cause the brake pads to remain in contact with the rotor when the actuating fluid pressure is removed or decreased, second piston 90 is spring loaded via second spring 100 which reacts against retainer 110 so that above a predetermined actuating fluid pressure, first piston 30, tube 70, and second piston 90 move freely as a single entity against the biasing force of second spring 100. In order to preclude external forces i. e., deflection of rotor 18 during vehicle cornering or while travelling on rough roads, from forcing first piston 30 to move back into caliper housing 14 and cause damage to the interior components located within bore 26, resilient means 37 is fitted freely between head 52 of rod 50 and wall 35 of recess 34. The collapsed load force of resilient means 37 is greater than the sliding load of first seal 40 and its normal load is less than the sliding load of second seal 60. The travel of resilient means 37 from normal load to collapsed load is specified to be equivalent to rotor deflection that may be tolerated. The brake assembly may be utilized to reduce to a consistent minimum the volume of actuating fluid (brake fluid) necessary to cause the linings of the brake pads to contact the rotor.

FIG. 2 illustrates an alternative embodiment of the present invention which eliminates the housing part 140. Similar structure is indicated by the same reference numerals utilized above. The retainer 112 includes stepped diameter portions 124 and 126. Caliper housing 114 includes an open end 116 having end part 118. Caliper housing 114 has stepped diameter parts 134 and 136 complementary to stepped diameter portions 124 and 126. Retainer vent 113 communicates with housing vent 117. The disc brake assembly operates in all respects identical to the operation described above.

FIG. 3 illustrates an alternative embodiment of the present invention which provides for piston knock-back and piston retraction. Structure similar to that described above is indicated by the same numeral increased by 200. Disc brake 210 includes a caliper housing 214 connected with the caliper 216 which engages the outer friction element 220. Piston 230 may be displaced axially outwardly by hydraulic fluid against inner friction element 222 to engage the rotor 218. Piston 230 is slidably fitted with seal 240 positioned within housing caliper 214. Piston 230 has a recess 234 which receives the head 252 of first rod 250. The head 252 is attached fixedly to piston 230 by means of snap ring 241. First rod 250 extends longitudinally within bore 226 and includes longitudinal opening 254. Solid tube or second rod 270 is disposed within opening 254 of first rod 250, second rod 270 carrying seal 260 which slidably and sealingly engages the surface of opening 254. Seal 260 has a higher sliding force or resistance to movement between first rod 250 and second rod 270 than the resistance to sliding movement imposed by seal 240 on the surface of piston 230. Second rod 270 has a flange 272 received within housing extension 219 and between housing wall 245 and rod flange 272. Spring 280 is located between rod flange 272 and a hardened washer 273 which is held in place by snap ring 271 seated in housing extension 219. Spring 280 has a load greater than that imposed by seal 240 and less than that imposed by seal 260, thus ensuring that upon release of the actuating medium pressure within bore 226, the piston 230 will be returned by an amount equal to the clearance between flange 272 of second rod 270 and hardened washer 273. To preclude external forces (i.e., deflection of the rotor 218 during vehicle cornering or on rough roads) from forcing piston 230 to move back into caliper housing 214, resilient means 237 is positioned between caliper housing wall 245 and flange 272. The collapsed load of resilient means 237 is less than the sliding load of seal 260 and the normal load of resilient means 237 is greater than the sliding load of seal 240, and equal to the normal load of spring 280. The travel of resilient means 237 from normal load to collapsed load has been specified to be equivalent to rotor deflection to be tolerated. The operational characteristics of piston retraction and piston knock-back perform as described above for the previous embodiments, however, the structure has been modified and simplified because of the elimination of the pressure compensation adjustment assembly.

Although the present invention has been illustrated and described in connection with the example embodiments, it will be understood that this is illustrative of the invention and is by no means restrictive thereof. It is to be expected that those skilled in the art can make numerous revisions and additions to the invention and it is intended that such revisions and additions will be included within the scope of the following claims as equivalents of the invention.

We claim:

1. A disc brake assembly comprising a caliper connected with a caliper housing having therein a bore, a first piston disposed within the bore for slidable movement therein, a first seal disposed between the piston and caliper housing, a rod extending within said bore and having a head connected with the first piston, resilient means disposed between the first piston and head, the rod having a tube disposed thereabout and the tube having a radially extending flange, a second seal disposed between said rod and tube, a second piston disposed within said bore and about said tube and rod, a first spring disposed between said flange and second piston, a retainer connected with the caliper housing and disposed within said bore, and a second spring located between and biasing apart said retainer and second piston, so that said second seal has a resistance to movement of the rod relative to the tube which resistance is greater than a resistance to movement effected by the first seal for movement of the first piston relative to the caliper housing.

2. The brake assembly in accordance with claim 1, further comprising a housing part disposed within the bore and about said second piston, sealing means disposed between said housing part and second piston so that the second piston is sealingly movable relative to said housing part.

3. The brake assembly in accordance with claim 2, wherein the retainer is fixed stationarily between said housing part and an abutment of said caliper housing.

4. The brake assembly in accordance with claim 3, wherein second sealing means is disposed between said housing part and surface of said bore.

5. The brake assembly in accordance with claim 3, wherein said retainer extends axially within said bore and is disposed within the first piston.

6. The brake assembly in accordance with claim 5, wherein said head is connected with said first piston by means of an annular member.

7. The brake assembly in accordance with claim 1, wherein the first spring is disposed between said flange of the tube and an abutment shoulder of said second piston.

8. The brake assembly in accordance with claim 1, wherein said retainer comprises a stepped diameter member, the stepped diameter member disposed adjacent complementary stepped diameter parts of the caliper housing in order to position the retainer within said bore.

9. The brake assembly in accordance with claim 8, wherein said second piston includes sealing means thereabout which slideably engage adjacent stepped diameter portions of the stepped diameter member.

10. The brake assembly in accordance with claim 8, wherein the second piston includes stepped diameter sections which are disposed adjacent complementary portions of the stepped diameter member.

11. A disc brake assembly comprising a caliper connected with a caliper housing having therein a bore, a first piston disposed within the bore for slidable movement therein, a first seal disposed between the piston and caliper housing, and adjustment means located within the bore, characterized in that the adjustment means comprises a rod extending within said bore and connected with the first piston, the rod having a tube disposed thereabout and the tube having a flange, a second seal disposed between said rod and tube, a second piston disposed within said bore and about said tube and rod, a first spring disposed between said flange and second piston, a stationary retainer disposed within said bore, and a second spring located between and biasing apart said retainer and second piston, so that said second seal has a resistance to movement of the rod relative to the tube which resistance is greater than a resistance to movement effected by the first seal for movement of the first piston relative to the caliper housing.

12. The brake assembly in accordance with claim 11, further comprising a housing part disposed within the bore and about said second piston, sealing means disposed between said housing part and second piston so that the second piston moves sealingly relative to said housing part.

13. The brake assembly in accordance with claim 12, wherein the retainer is fixed stationarily between said housing part and an abutment of said caliper housing.

14. The brake assembly in accordance with claim 13, wherein second sealing means is disposed between said housing part and surface of said bore.

15. The brake assembly in accordance with claim 13, wherein said retainer extends axially within said bore and an end is disposed within the first piston.

16. The brake assembly in accordance with claim 15, wherein resilient means is disposed between said first piston and rod.

17. The brake assembly in accordance with claim 11, wherein the first spring is disposed between said flange of the tube and an abutment shoulder of said second piston.

18. The brake assembly in accordance with claim 11, wherein said retainer comprises a stepped diameter member, the stepped diameter member disposed adjacent complementary stepped diameter parts of the caliper housing in order to position the retainer within said bore.

19. The brake assembly in accordance with claim 18, wherein said second piston includes sealing means thereabout which slideably engage adjacent stepped diameter portions of the stepped diameter member.

20. The brake assembly in accordance with claim 18, wherein the second piston includes stepped diameter sections which are disposed adjacent complementary portions of the stepped diameter member.

21. A disc brake assembly comprising a caliper connected with a caliper housing having a bore, a piston disposed within the bore for slidable movement therein, a first seal disposed between the piston and caliper housing, and adjustment and deflection means located within the bore, characterized in that the adjustment and deflection means comprises a first rod extending within said bore and connected with said piston, the first rod having an opening therein and receiving a second rod within the opening, a second seal disposed between said rods, the second rod having a flange about an end received within a caliper housing extension located within the bore, a first spring disposed between one side of said flange and said housing extension, a second spring disposed on the other side of the flange between the flange and caliper housing, so that said second seal has a resistance to movement of the first rod relative to the second rod which resistance is greater than a resistance to movement effected by the first seal for movement of the piston relative to the caliper housing.

22. The disc brake assembly in accordance with claim 21, wherein said first and second springs comprise at least one of a Belleville washer and a spring washer.

23. The disc brake assembly in accordance with claim 21, wherein said housing extension extends within said bore and includes a central opening receiving therein the springs, flange, and abutment means for retaining said springs and flange between said abutment means and an end wall of the caliper housing.

* * * * *